US010974435B2

(12) United States Patent
Gomibuchi et al.

(10) Patent No.: US 10,974,435 B2
(45) Date of Patent: Apr. 13, 2021

(54) METHOD FOR PRODUCING FOAM BLOW-MOLDED ARTICLE

(71) Applicant: JSP CORPORATION, Tokyo (JP)

(72) Inventors: Masahiro Gomibuchi, Shimotsuke (JP); Toshio Morita, Utsunomiya (JP)

(73) Assignee: JSP CORPORATION, Tokyo (JP)

( * ) Notice: Subject to any disclaimer, the term of this patent is extended or adjusted under 35 U.S.C. 154(b) by 253 days.

(21) Appl. No.: 15/528,993

(22) PCT Filed: Dec. 11, 2015

(86) PCT No.: PCT/JP2015/084781
§ 371 (c)(1),
(2) Date: Sep. 29, 2017

(87) PCT Pub. No.: WO2016/098695
PCT Pub. Date: Jun. 23, 2016

(65) Prior Publication Data
US 2018/0009152 A1    Jan. 11, 2018

(30) Foreign Application Priority Data
Dec. 18, 2014 (JP) .............................. JP2014-256656

(51) Int. Cl.
*B29C 49/04* (2006.01)
*B29C 33/20* (2006.01)
(Continued)

(52) U.S. Cl.
CPC .............. *B29C 49/04* (2013.01); *B29C 33/20* (2013.01); *B29C 49/0005* (2013.01);
(Continued)

(58) Field of Classification Search
CPC ..... B29C 49/04; B29C 49/4802; B29C 49/16; B29C 49/4252; B29C 49/58; B29C 2049/4667
See application file for complete search history.

(56) References Cited

U.S. PATENT DOCUMENTS 3,709,290 A * 1/1973 Upmeier ................. B29C 48/10
165/47
4,938,674 A * 7/1990 Liberman ............... B29C 48/30
425/72.1
(Continued)

FOREIGN PATENT DOCUMENTS

DE    10 2010 004586 A1    7/2011
JP    06-218801 A    8/1994
(Continued)

OTHER PUBLICATIONS

Kano, Yoshiaki, English translation of JPH06218801, Aug. 9, 1994 (Year: 1994).*
(Continued)

*Primary Examiner* — Anthony Calandra
*Assistant Examiner* — Eric T Chen
(74) *Attorney, Agent, or Firm* — Bacon & Thomas, PLLC

(57) ABSTRACT

A method for producing a foamed blow-molded article, which includes extruding a physical blowing agent-containing foamable molten resin downwardly through a annular die to form a tubular foamed parison, clamping the foamed parison between split molds, and then blow molding it. At the latest before completion of the clamping of the foamed parison between the split molds, a gas is blown toward an inner peripheral surface of an upper portion of the foamed parison, the bottom portion of which has been closed, from
(Continued)

a gas ejection outlet located within the foamed parison at a position immediately below the annular die to widen the foamed parison.

15 Claims, 7 Drawing Sheets

(51) Int. Cl.
  *B29C 49/42* (2006.01)
  *B29C 49/00* (2006.01)
  *B29C 49/18* (2006.01)
  *B29C 49/58* (2006.01)
  *B29C 49/46* (2006.01)
  *B29C 49/56* (2006.01)
  *B29K 105/04* (2006.01)

(52) U.S. Cl.
  CPC .......... *B29C 49/18* (2013.01); *B29C 49/4247* (2013.01); *B29C 49/4252* (2013.01); *B29C 49/58* (2013.01); *B29C 49/56* (2013.01); *B29C 2049/4667* (2013.01); *B29K 2105/04* (2013.01)

(56) References Cited

U.S. PATENT DOCUMENTS

| | | |
|---|---|---|
| 5,085,822 A | 2/1992 | Uehara |
| 6,432,525 B1 | 8/2002 | Gokuraku |

FOREIGN PATENT DOCUMENTS

| | | | | |
|---|---|---|---|---|
| JP | 06218801 A | * | 8/1994 | ............. B29C 49/58 |
| JP | H06218800 A | * | 8/1994 | ............. B29C 49/58 |
| JP | H10 100236 A | | 4/1998 | |
| JP | 2002-192601 A | | 7/2002 | |
| JP | 2002192601 A | * | 7/2002 | |
| JP | 2006-305793 A | | 11/2006 | |

OTHER PUBLICATIONS

Gokuraku, Hiroyuki, English translation of JP2002192601, Jul. 10, 2002 (Year: 2002).*
Shibata, English translation of JPH06218800A, Aug. 9, 1994 (Year: 1994).*
International Search Report (ISR) dated Mar. 15, 2016, for PCT/JP2015/084781, and English translation thereof.
Supplemental EPO Search Report for related EP 15869900 dated Jul. 18, 2018.
SIPO Search Report for related Chinese application 2015800689892 dated Jul. 24, 2018.

* cited by examiner (a)

(b)

(a)

(b)

METHOD FOR PRODUCING FOAM BLOW-MOLDED ARTICLE

TECHNICAL FIELD

The present invention relates to a method for producing a foamed blow-molded article by subjecting a foamed parison to blow molding.

BACKGROUND OF THE INVENTION

There has been hitherto carried out production of a foamed article by utilizing blow molding (hereinafter referred to as "foamed blow-molded article"). As a representative method for obtaining such a foamed blow-molded article, there may be mentioned a blow molding method which includes melting and kneading a blowing agent and a base resin using an extruder, extruding the obtained foamable resin melt through a die into a tubular foamed parison, clamping the foamed parison between split molds, and blowing a pressurized gas into the interior of the closed parison to press the foamed parison against the interior surface of the mold.

The thus obtained foamed blow-molded articles are suitably used as various kinds of receptacles, heat insulating ducts, cushioning materials, energy absorbing materials and various structural materials because of their excellent light weight property, heat insulating property and impact characteristics.

In producing a foamed blow-molded article, a foamable resin melt extruded through an annular die into a tubular shape begins foaming and expanding just after having been extruded and forms a foamed parison. In this case, because cells in the foamed parison grow in the extrusion direction, circumference direction and thickness direction of the tubular foamed prison, the perimeter length of the foamed parison increases. When a foamed blow-molded article having a low apparent density (a high expansion ratio) is intended to be produced, a wave-like corrugation is formed in the foamed parison, because a rate of increase of the perimeter length of the foamed parison is high.

More concretely, as shown in FIG. 4(a), a foamed parison 51 immediately after extrusion has a sectional shape that is similar to the shape (generally circular or elliptical) of the resin discharge outlet. As the foaming proceeds, however, the perimeter length of the foamed parison increases, as shown in FIG. 4(b), because of growth of the cells. This results in generation of folds in the tubular parison and formation of wave-like corrugations (like pleats of a curtain) in which protruded portions 5(a) and recessed portions 51(b) alternately appear.

When a corrugation is produced in the foamed parison and remains present until the foamed parison is clamped between molds, the folded recessed portions 51(b) of the foamed parison may be protruded inward of the tube. Thus, when the molds are closed to clamp the foamed parison, the folded portions are apt to be fusion bonded. As a consequence, the obtained foamed blow-molded article is likely to be formed inside with protrusion and depression or with ridges as shown in FIG. 5(b). Thus, there is a high possibility that the desired hollow foamed blow-molded article having a smooth sectional shape as shown in FIG. 5(a) fails to be obtained. Further, there is a high possibility that the obtained foamed blow-molded article is formed with surface stripes or with significantly thick portions, due to overlapping of the folded portions of the foamed parison.

With a view toward resolving generation of corrugation of the foamed parison, JP-A-2002-192601 discloses a method in which, after closing a lower portion of a tubular foamed parison extruded through a die, a gas is blown into the parison in the extrusion direction thereof to expand the parison before the parison is clamped between split molds and/or while it is clamped by molds.

Also, JP-A-2006-305793 discloses a method for resolving generation of corrugation by adjusting a widening ratio of a foamed parison and an inside pressure with the foamed parison.

SUMMARY OF THE INVENTION

Problems to be Solved by the Invention

When an attempt is made to obtain a foamed blow-molded article having a lower apparent density for the purpose of further reducing the weight thereof, it becomes difficult to resolve the problem of corrugation by adopting the above-mentioned production methods and, hence, the molded article tends to be formed with the afore-mentioned ridges or stripes.

The present invention has its object to solve the above-described problems and to provide a method for producing a foamed blow-molded article, in particular, a hollow foamed blow-molded article which method has resolved the formation of corrugation in a foamed parison and is capable of producing a foamed blow-molded article having good appearance in a stable manner.

In accordance with one aspect of the present invention there is provided:

[1] A method for producing a foamed blow-molded article, comprising the steps of:
(a) extruding a physical blowing agent-containing foamable molten resin vertically downwardly through an annular die to form a tubular foamed parison,
(b) closing a bottom portion of the foamed parison,
(c) blowing a gas toward a whole inner peripheral surface of an upper portion of the foamed parison, the bottom portion of which has been closed, from a gas ejection outlet located within the foamed parison at a position immediately below the annular die to widen the foamed parison,
(d) closing split molds to clamp the foamed parison therebetween, and
(e) blow molding the foamed parison within the split molds,
wherein step (c) is carried out at the latest before completion of step (d).

The present invention also provides the following method for producing a foamed blow-molded article:

[2] The method as recited in above [1], wherein a ratio (D2/D1) of a perimeter length (D2) of the foamed parison that has been widened in step (c) to a perimeter length (D1) of a resin discharge outlet of the annular die is 3.0 or more.

[3] The method as recited in above [1] or [2], wherein the physical blowing agent is an inorganic physical blowing agent;

[4] The method as recited in any one of above [1] to [3], wherein the foamed blow-molded article obtained in step (e) has an apparent density of 0.1 to 0.25 g/cm$^3$ and an average thickness of 1 to 4 mm;

[5] The method as recited in any one of above [1] to [4], wherein, in step (c), the gas is ejected from the gas ejection outlet at an angle of 70-110 degrees relative to the vertical direction.

[6] The method as recited in above 1, wherein the gas ejection outlet is an annular slit and the gas is ejected from the gas ejection slit in all 360 degrees directions around a centerline of the annular die.

[7] The method as recited in above 1, wherein the gas ejection outlet is positioned between just below the discharge outlet of the annular die and above a mold cavity of the molds.

In a production method according to the present invention, a gas is blown toward an inner peripheral surface of an upper portion of a foamed parison, the bottom portion of which has been closed, from a gas ejection outlet located within the foamed parison at a position immediately below the annular die before, at the latest, completion of clamping of the foamed parison between molds. By this, it is possible to widen the foamed parison in such a manner that a corrugation formed in the foamed parison does not remain present. Therefore, generation of ridges or stripes on a surface of the foamed article or on an interior surface of a hollow portion of the formed article may be reduced and, hence, it is possible to easily and stably obtain foamed blow-molded articles having excellent appearance.

BRIEF DESCRIPTION OF THE DRAWINGS

FIGS. 4(a) to 4(b) are explanatory views showing generation of corrugation in a foamed parison, wherein FIG. 4(a) is a cross-sectional view showing the foamed parison just after it has been extruded from a die, and FIG. 4(b) is a cross-sectional view showing the foamed parison in which a corrugation is generated after foaming has proceeded.

FIGS. 5(a) to 5(b) are explanatory views showing obtained foamed blow-molded article, wherein FIG. 5(a) is an explanatory view showing a blow molded article having a smooth interior surface, and FIG. 5(b) is an explanatory view showing a foamed blow-molded article having an interior surface formed with a ridge attributed to corrugation.

DETAILED DESCRIPTION OF THE INVENTION

Figure 1:
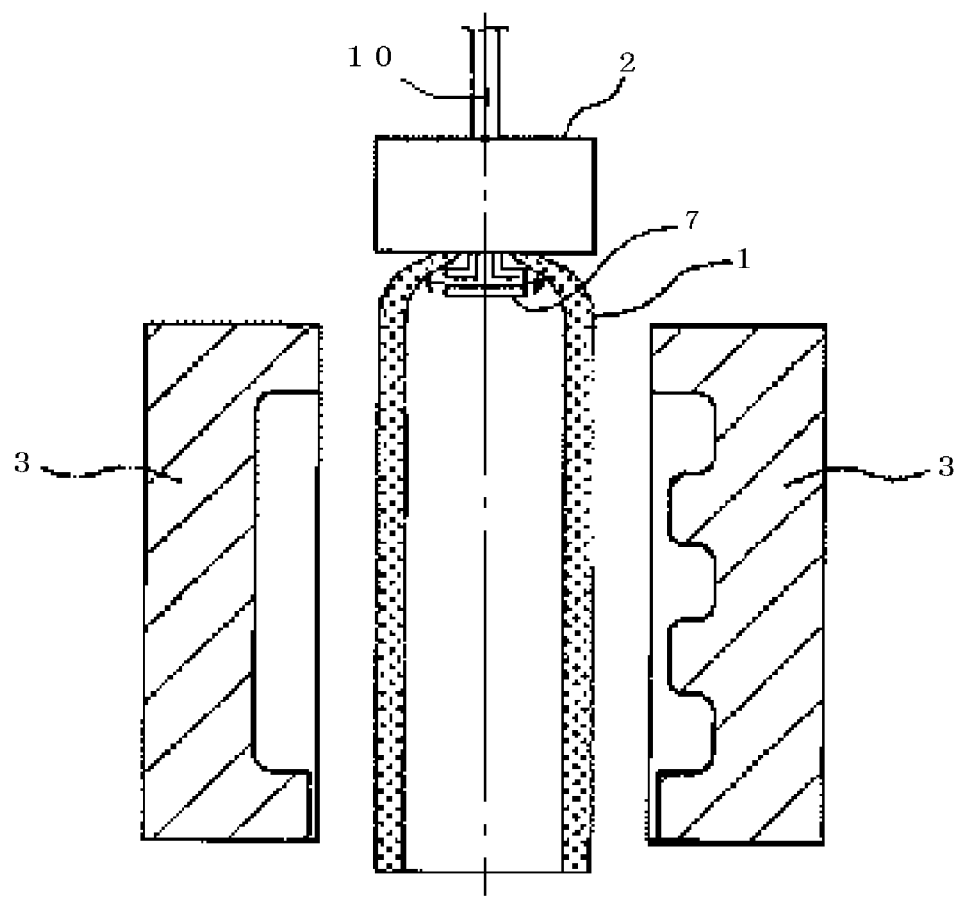
FIG. 1 is an explanatory view showing one embodiment of a step of forming a foamed parison according to a production method of the present invention.
Figure 2:
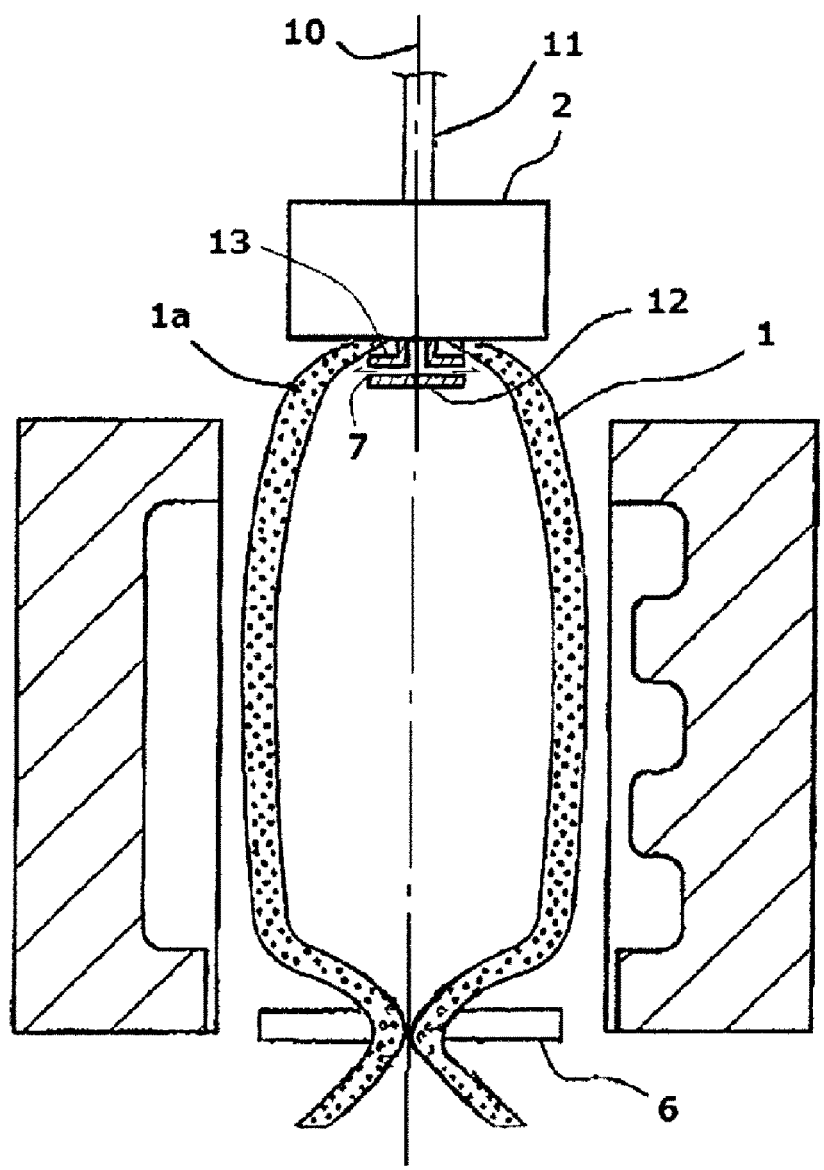
FIG. 2 is an explanatory view showing one embodiment of a step of widening a foamed parison after closing a bottom portion of the foamed parison according to a production method of the present invention.
Figure 3:
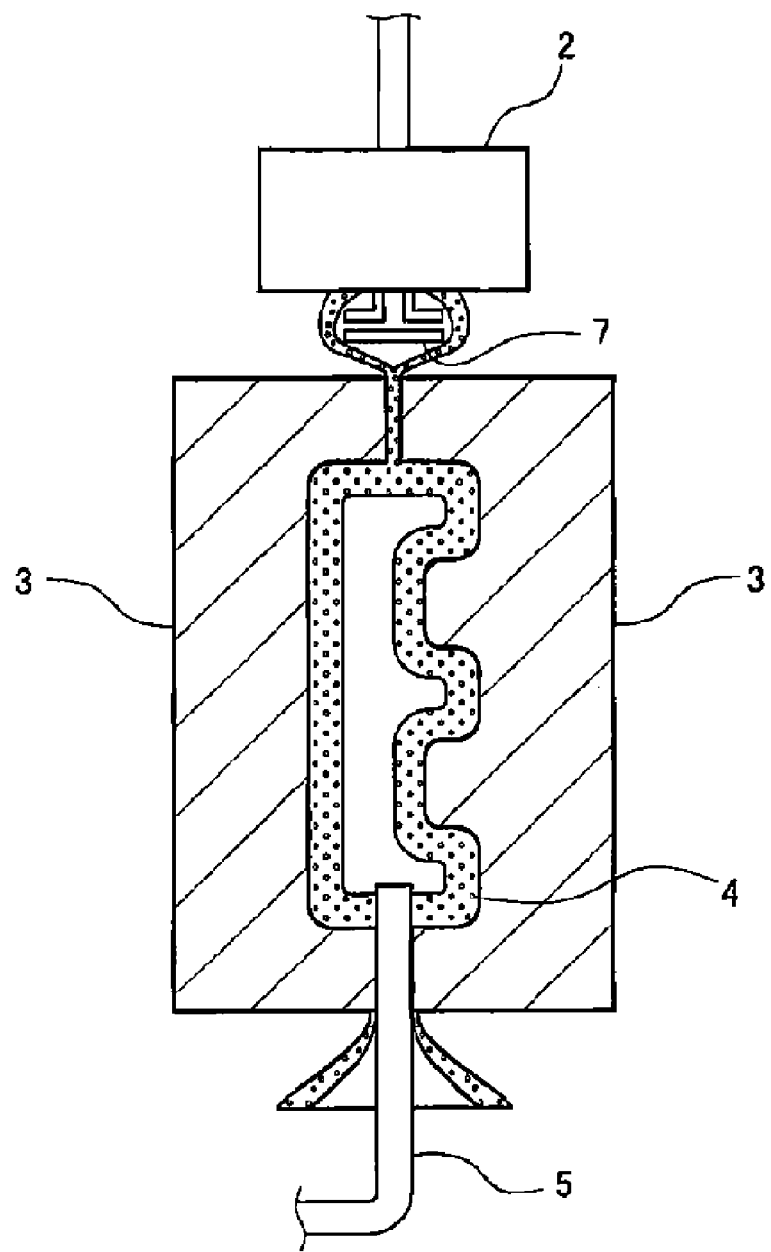
FIG. 3 is an explanatory view showing one embodiment of a step of subjecting a widened foamed parison to blow molding after closing molds according to a production method of the present invention.

Preferred embodiments of the method for producing a foamed blow-molded article according to the present invention will be described below with reference to FIGS. 1 to 3. First, as shown in FIG. 1, a foamable resin melt containing a physical blowing agent is extruded vertically downwardly through an annular die 2 to form a tubular foamed parison 1 (step (a)). Next, the foamed parison 1 is disposed between split molds 3 and, thereafter, a bottom portion of the foamed parison 1 is closed by means of a pinch 6 as shown in FIG. 2 (step (b)). Next, as shown in FIG. 3, the split molds 3 are closed to hold or clamp the foamed parison 1 therebetween (step (d)). Thereafter, the foamed parison 1 is subjected to blow molding (step (e)). Meanwhile, in FIG. 2, the reference numeral 10 denotes a centerline of the annular die 2. This centerline substantially coincides with a longitudinal axis of the parison 1. As used herein, the term "vertical direction" or "vertical" is intended to refer to a direction that is in parallel with the centerline 10 of the annular die 2. The term "horizontal direction" is intended to refer to a direction that is normal to the vertical direction.

The feature of the method of the present invention resides in that a gas is blown, at the latest before completion of step (d) (namely, at the latest before completion of clamping of the foamed parison 1 by split molds 3) toward an inner peripheral surface of an upper portion of the foamed parison 1, the bottom portion of which has been closed, from a gas ejection outlet 7 located within the foamed parison 1 at a position immediately below the annular die 2 to widen the foamed parison. By this, it becomes possible to eliminate corrugation.

Here, a cause of generation of corrugation in the foamed parison is described in detail. In a foam blow molding process, a foamable resin melt is extruded downward from a resin outlet of an annular die to form a tubular foamed parison. Thus, the growing speeds of the cells in the extrusion direction of the foamed parison, in the perimetric direction of the tube and in the thickness direction of the parison are nearly the same. Therefore, the expansion proceeds such that the dimensions in the above respective directions are nearly equal to the dimensions in the non-expansion state multiplied by cube root of the expansion ratio.

Figure 4:
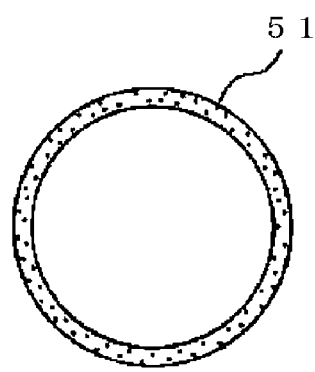
Figure 4:
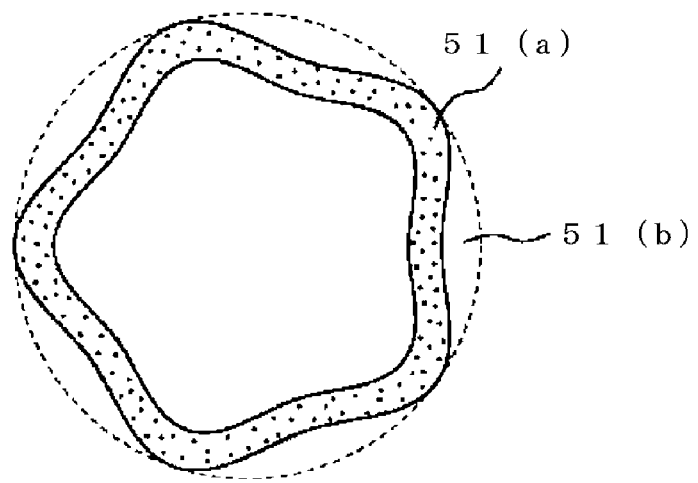
Figure 5:
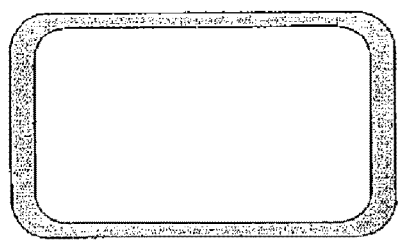
Figure 5:
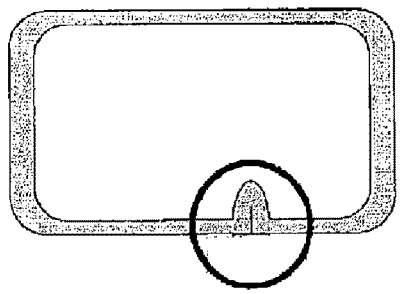

More concretely, provided that the cross-sectional shape of a resin discharge outlet of an annular die is circle, the perimeter length of a foamed parison in which foaming has proceeded is a length that nearly equals the perimeter length of the resin discharge outlet multiplied by cube root of the expansion ratio (namely a value obtained by dividing the density of the foamable resin melt by the apparent density of the foamed parison). Thus, the lower the apparent density of the foamed parison (the greater the expansion ratio) the greater the perimeter length of the tubular foamed parison. As a consequence, that portion of the perimeter length of a foamed parison which has excessively increased is not able to sufficiently extend along the perimetric direction but is loosened to form, as shown in FIG. 4(b), bent portions that result in formation of a corrugation in which protruded portions 51a and depressed portions 51b are alternately present. As described previously, when a corrugation is produced, the finally obtained hollow foamed blow-molded article is also formed with ridges or stripes as shown in FIG. 5(b).

Incidentally, as described previously, corrugation is not produced immediately after a foamable resin melt is extruded (FIG. 4(a)) because foaming has not yet proceeded. As the foaming proceeds, however, corrugation is produced (FIG. 4(b)).

Figure 6:
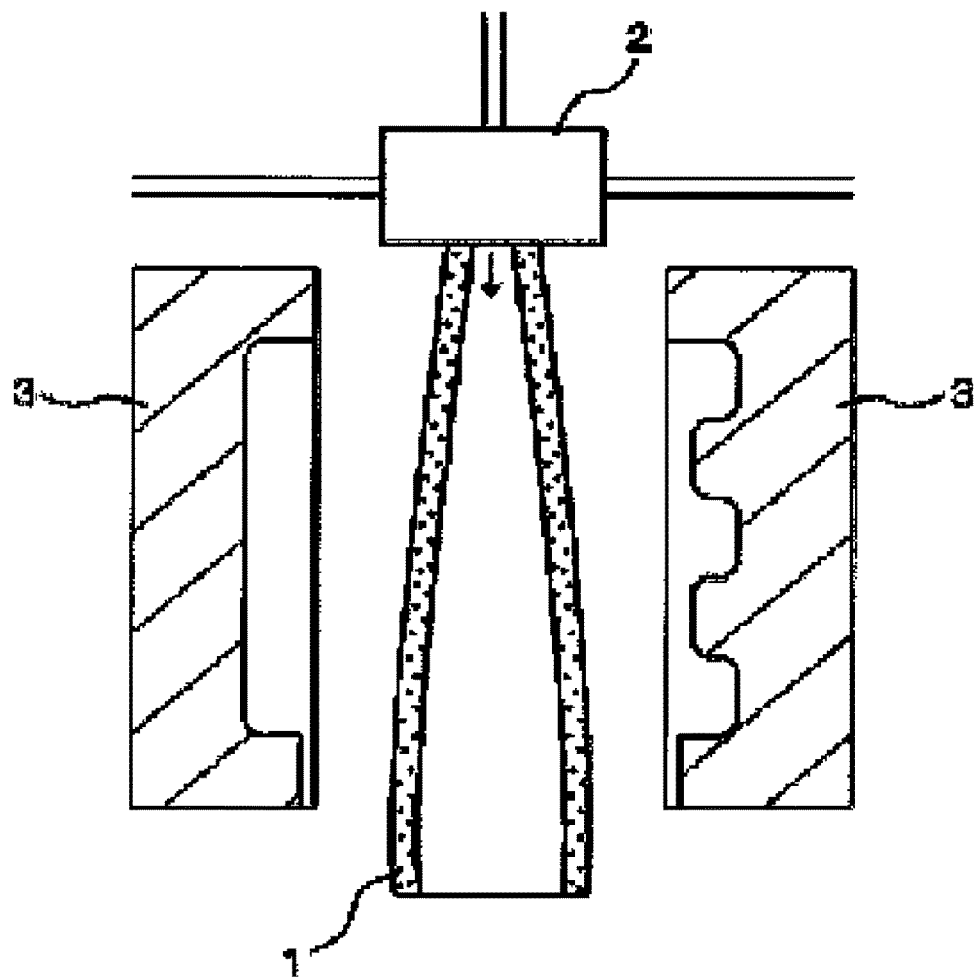
FIG. 6 is an explanatory view showing a step, in a conventional production method, of forming a foamed parison.
Figure 7:
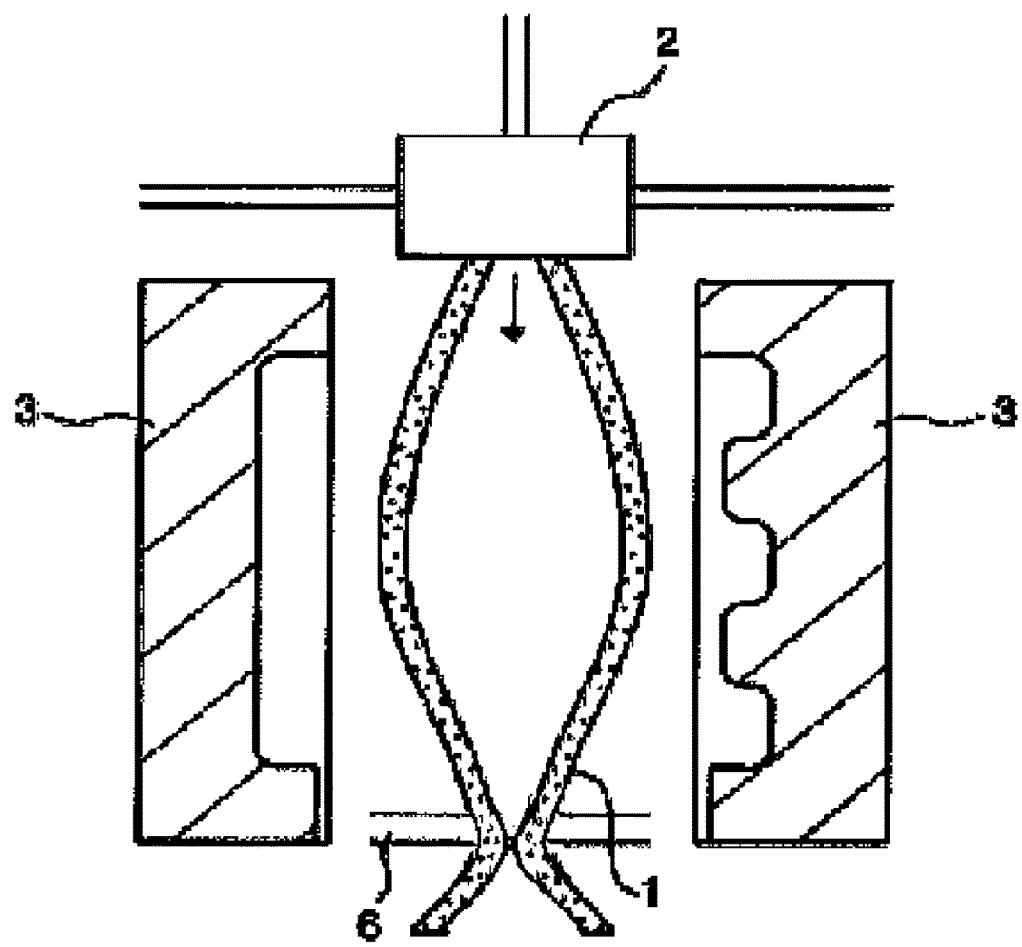
FIG. 7 is an explanatory view showing an example of a step, in a conventional production method, of widening a foamed parison whose bottom portion has been closed.

In order to eliminate the above-described corrugation, in the afore-mentioned conventional method, a bottom portion of a foamed parison is closed before the foamed parison is clamped by molds, and, thereafter, a gas is injected into the foamed parison to increase its inside pressure and to widen the foamed parison. This method is based on an idea that corrugation of the foamed parison may be suppressed by an increase of the inside pressure thereof. More concretely, in the conventional technique, a method is adopted in which a gas is blown into the foamed parison through a through-hole that is in communication with outside and that is provided in an inside part which constitutes a resin discharge outlet of an annular die. Namely, as shown in FIG. 6, a foamable resin melt containing a physical blowing agent is extruded downward from a resin discharge outlet of an annular die to form a tubular foamed parison. Then, as shown in FIG. 7, a bottom portion of the foamed parison is closed before being clamped with molds and, thereafter, a gas is blown from the annular die vertically downward (as shown by the arrow in FIG. 6 and FIG. 7) into the foamed parison to increase the pressure inside the foamed parison and to widen the foamed parison. The molds are then closed and a blowing nozzle (not shown) is inserted into the foamed parison disposed in the molds. Blow air is blown from the blowing nozzle to perform blow molding. When a foamed blow-molded article having a low apparent density or a foamed blow-molded article having a thin thickness is intended to be produced, however, a large corrugation is produced in the foamed parison. Even when an inside pressure of the foamed parison is increased in order to eliminate the corrugation, it is not possible to resolve the formation of corrugation in an upper portion of the foamed parison. If the inside pressure is further increased, not only corrugation in an upper portion of the foamed parison is uneliminated, but there is also caused a problem that the thickness of the foamed parison becomes non-uniform because only a lower part of the foamed parison is locally stretched because the blowing direction of the gas is vertical. The present inventors have found that a manner and a position of blowing of a gas into the foamed parison have an influence upon elimination of corrugation of the foamed parison and have accomplished the present invention.

In the method of the present invention, as shown in FIG. 2, a gas is blown, at the latest before completion of clamping of the foamed parison 1 by split molds 3 (namely, at the latest before completion of step (d)) toward an inner peripheral surface of an upper portion of a foamed parison 1, a bottom portion of which has been closed, from a gas ejection outlet 7 located within the foamed parison 1 at a position immediately below an annular die 2 to widen the whole foamed parison 1 including the upper portion of the foamed parison 1. As used herein, the term "blown toward an inner peripheral surface of an upper portion of a foamed parison" is intended to mean that a gas is blown toward a perimetric line defined by the intersection of an upper portion of the parison 1 and a plane perpendicular to the center line 10. It is preferred that the gas is uniformly blown toward the entire perimetric line. The term "blown, at the latest before completion of clamping of the foamed parison 1 by split molds 3" is intended to include, for example, a case in which the blowing of a gas is started after closure of a bottom portion of the foamed parison 1 by means of a pinch 6 and is terminated before the commencement or completion of the clamping by split molds 3. The blowing of the gas may be started after start of clamping of the foamed parison 1, which has been closed by the pinch 6, by split molds 3 (after start of closure of the split molds 3).

As the gas blown toward an inner peripheral surface of the foamed parison, air is generally used. However, the gas is not limited to air. A gas such as nitrogen may be used.

When the gas is blown toward an upper portion of the inner peripheral surface of the foamed parison 1, the gas ejected from the ejection outlet forms a stream and impinges upon the foamed parison. Thus, an upper portion of the foamed parison receives an influence of the air stream and is widened in the horizontal direction to form a shoulder part 1a as shown in FIG. 2. Because the air stream becomes weak beneath the shoulder part 1a, a lower part of the foamed parison is prevented from being excessively widened. Thus, the foamed parison 1 is widened in such a state that it is suspended from the shoulder part 1a. Because the foamed parison is widened in such a shape, it is possible to eliminate corrugation of the parison as a whole. Further, because the foamed parison is prevented from being locally stretched, it is possible to uniformize the perimeter length of the parison at any portion within the range in which the foamed parison is formed and, therefore, to improve the molding efficiency. Additionally, after the foamed parison has been formed with the shoulder part 1a and prevented from being formed with corrugation, the gas flows nearly in parallel with the inner surface of the formed parison. Therefore, the inner surface of the foamed parison is cooled with the blown gas so that surface roughening by excessive foaming may be suppressed.

When a foamed blow-molded article having a low apparent density and a thin wall thickness is to be produced, the strength of the foamed parison generally tends to be lowered. Thus, corrugation is apt to be produced because a tubular shape is difficult to be maintained. Even in such a case, blowing of a gas toward an inner peripheral surface of an upper portion of the foamed parison 1 can widen the upper portion of the parison upon which a gas stream impinges. Therefore, even when the foamed parison has a light weight and a thin thickness, corrugation can be effectively eliminated.

In order to widen the foamed parison, the blowing of the gas on the inner peripheral surface of an upper portion of the parison from the ejection outlet 7 is carried out in the state where a bottom portion of the foamed parison 1 is closed by being pinched by a parison pinch 6. However, it is possible to start the gas blow on the inner peripheral surface of the parison before closure of the bottom portion of the foamed parison 1 (for example, immediately after the foamable resin melt has been extruded from the annular die), and the gas may be continuously blown after the parison has been pinched. In this case, before the closure of the parison, the foamed parison is almost not widened and cooling of the interior surface of the parison mainly proceeds. After the closure, widening of the parison and cooling of the interior surface of the parison proceed.

As a method for closing a bottom portion of the tubular foamed parison 1, it is preferred to use a method in which the bottom portion of the extruded foamed parison is pinched to fuse-bond the interior surface of the parison by means of, for example, a parison pinch 6, which is, as shown in FIG. 2, installed beneath the resin discharge outlet of the die 2 and which is composed of a pair of plates that are configured to be driven in a direction normal to the vertical direction in which the foamed parison is suspended, namely in the horizontal direction. The present invention is, however, not limited to the above method. Any method may be adopted as long as the bottom portion of the parison 1 can be closed. The blow nozzle 5 used for blowing blow air may be previously inserted before the foamed parison is pinched. Alternately, the blow nozzle 5 may be inserted into the foamed parison, placed in the split molds 3, after the completion of clamping of the split molds 3.

The above-described term "upper portion of the foamed parison" is intended to refer to a portion of the foamed parison from the parison discharge outlet of the annular die to $1/3$ the length, preferably to $1/4$ the length, more preferably to $1/5$ length, in the vertical direction, of the expanded parison. As used herein, the term "length, in the vertical direction, of the expanded parison" is intended to refer to the length in the vertical direction between the discharge outlet of the annular die and the portion at which the parison is pinched.

When the position of the expanded parison on which the gas is blown is excessively low, corrugation of an upper part of the expanded parison is not eliminated. Thus, there is a possibility that the obtained foamed blow-molded article is formed with ridges or stripes and a region of the foamed parison that can be molded is decreased.

It is preferred that the gas ejection outlet 7 is constructed in the form of an annular slit as shown in FIG. 2, since it allows the gas to be blown toward an inner peripheral surface of the expanded parison in 360 degree directions at a uniform flow rate. The gas ejection outlet used in the method of the present invention is, however, not limited to the annular slit. As long as the gas is able to be blown upon a whole inner peripheral surface of the foamed parison, it is possible to construct the ejection outlet by, for example, arranging 4 to 10 ejection nozzles equidistantly in the circumferential direction.

It is preferred that the gas is ejected in nearly horizontal direction (as shown by the arrows in FIG. 2) from the gas ejection outlet and is blown on an inner peripheral surface of the foamed parison. By blowing the gas in this manner, it is possible to form the foamed parison into a shape that enables to prevent corrugation. The preferred gas ejection direction is in the range of about 70 to 110 degrees relative to the vertical direction (extrusion direction of the parison). Here, a gas ejection direction of 90 degrees is the horizontal direction, a gas ejection direction of less than 90 degrees is a downward direction relative to the horizontal direction, and a gas ejection direction of greater than 90 degrees is an upward direction relative to the horizontal direction.

The gas ejection outlet 7 is provided just below the annular die and, generally, on the centerline 10 of the annular die. More concretely, the gas ejection outlet 7 is provided at a position between just below the discharge outlet of the annular die and above the portion clamped by the molds (mold cavity portion), preferably about 0.5 to 15 cm, more preferably 1 to 5 cm, below the discharge outlet of the annular die. By providing the ejection outlet 7 at such a position, it is possible to uniformly blow the gas on an upper portion of the foamed parison.

A structure of the preferred gas ejection outlet 7 is briefly described with reference to FIG. 2. A mandrel 11 extends within the annular die 2 concentrically with the centerline 10 with its lower end portion protruding from the undersurface of the annular die 2. A vertical passageway (not shown) is formed within the mandrel 11 and has an upper end from which a gas is supplied under pressure. The mandrel 11 is provided with a gas ejection head having a disc plate 12 and an annular plate 13 located thereabove. The disc plate 12 and the annular flange 13 are so constructed as to define therebetween an annular slit (gas ejection outlet) 7 that is in communication with a lower end of the vertical passageway of the mandrel 11. Thus, the gas supplied to the vertical passageway of the mandrel 11 is led to the gas ejection head and discharged from the annular slit 7 in all 360 degrees directions around the centerline 10. By adjusting orienting directions of the annular slit, the ejection direction of the gas may be set, for example, in a horizontal direction as shown by the arrows in FIG. 2.

The pressure of the gas supplied to the ejection outlet 7 varies with the kind of the base resin, the apparent density, the thickness, etc. of the expanded parison, but is preferably about 0.05 to 1 MPa(G), more preferably 0.1 to 0.6 MPa(G). Within such a pressure range, the foamed parison will not cause draw down and will be effectively widened in its upper portion and corrugation will be able to be eliminated. From the standpoint of reduction of molding time by expanding the foamed parison earlier, the lower limit of the above pressure is more preferably 0.2 MPa(G). The pressure may be controlled by means of a pressure adjuster.

In the method of the present invention, by blowing a gas from the ejection outlet 7 for the prevention of corrugation, the whole of the expanded parison 1 inclusive of its upper portion is widened. Because the upper portion of the expanded parison is widened early after the extrusion, a variation of the thickness of the foamed blow-molded article attributed to excess stretching of a lower portion of the expanded parison is prevented from occurring. In particular, even when a thin thickness molded article that is susceptible to cause a variation of the thickness thereof is to be obtained, the method can produce a foamed blow-molded article having further excellent thickness uniformity.

The degree of widening is preferably such that, in that region of the expanded parison which is subjected to molding (the portion positioned within the split molds 3), the minimum of the widening ratio value (D2/D1) of the perimeter length (D2) of the foamed parison that have been widened to the perimeter length (D1) of a resin discharge outlet of an annular die 2 (the widening ratio value of the least widened portion) is 3.0 or more. The upper limit of the widening ratio (D2/D1) of each portion of the expanded parison is preferably 5, more preferably 4.5. When the widening ratio (D2/D1) of each portion of the expanded parison is in the above range, corrugation may be eliminated by widening and the expanded parison shows excellent shapability.

After the parison has been formed as shown in FIG. 2, the molds are closed to clamp the foamed parison as shown in FIG. 3 and to carry out blow molding. Thus, when the closure of the molds is completed, a gas is injected from a blow nozzle 5 that has been inserted into the foamed parison, whereby the blow molding is carried out. The pressure of the injected gas is generally 0.05 to 0.6 MPa(G), preferably 0.1 to 0.4 MPa(G).

After the foamed parison 2 clamped by the molds has been subjected to blow molding into a desired shape, it is taken out of the molds and processed for the removal of flash, thereby obtaining a foamed blow-molded article.

In the method of the present invention, a physical blowing agent-containing foamable molten resin is extruded downward through an annular die to form a tubular foamed parison. Examples of the thermoplastic resin that constitutes the foamable resin melt include polyolefin-based resins such as polyethylene-based resins and polypropylene-based resins, polystyrene-based resins, polycarbonate resins, polyvinyl chloride resins, acrylic-based resins, acrylonitrile-based resins, polyester-based resins, polyamide-based resins, elastomers, and blend polymers of these resins. Above all, the use of a polyolefin-based resin is preferred. When the polyolefin-based resin is used as a mixture with another resin, the mixed resin preferably contains the polyolefin-based resin in an amount of at least 50% by weight, more preferably at least 70% by weight, still more preferably at least 90% by weight. As the thermoplastic resin, a recycled, regenerated resin may be used. More concretely, recycled resins obtained by grinding and defoaming thermoplastic resin-containing foam moldings and mold flash produced during the molding procedure, etc. or recycled resins obtained by melting and re-pelletizing these resins may be used.

Examples of the polyethylene-based resin include low-density polyethylene, high-density polyethylene, linear low-density polyethylene, ultralow-density polyethylene, ethylene-vinyl acetate copolymer, ethylene-methyl acrylate copolymer, ethylene-methacrylic acid copolymer, and ionomer resins obtained by crosslinking between the molecules thereof with metal ions.

As the polypropylene-based resin, there may be mentioned, for example, a polypropylene homopolymer and a propylene-based copolymer having at least 50% by weight of structural units derived from propylene. Examples of such a copolymer include copolymers of propylene and α-olefin having 4 or more carbon atoms, such as ethylene-propylene copolymers, propylene-butene copolymers and propylene-ethylene-butene terpolymer; propylene-acrylic acid copolymers and propylene-maleic anhydride copolymers. These copolymers may be any of block copolymers, random copolymers and graft copolymers.

When the polyolefin-based resin such as polyethylene-based resin and polypropylene-based resin as described above is used, it is preferred that the resin has a melt tension (MT) of 1.0 cN or more, more preferably 1.5 cN or more, still more preferably 3 cN or more, especially 4.0 cN or more. The upper limit of the melt tension is about 45 cN.

The melt tension (MT) is as measured according to ASTM D1238 and may be measured using, for example, Melt Tension Tester Model II (manufactured by Toyo Seiki Seisaku-Sho, Ltd.). Namely, the resin is extruded in the form of a string through a cylindrical orifice having a nozzle diameter of 2.095 mm and a length of 8.0 mm at a piston speed of 10 mm/minute and at a temperature of 230° C. (when the polyolefin resin-based is a polypropylene-based resin) or 190° C. (when the polyolefin resin-based is a polyethylene-based resin). The measurement is carried out by putting the extruded resin string on a tension-detecting pulley having a diameter of 45 mm and taking up the string on a take-up roller having a diameter of 50 mm while increasing the take-up speed at a rate of 5 rpm/sec.

The above-described polyolefin-based resin is desired to have a melt flow rate (MFR) of 0.1 to 20 g/10 min. When the melt flow rate is within the above range, it is possible to obtain a molded article having the shape corresponding to the mold and to obtain a foamed blow-molded article having more uniform thickness because a draw down phenomenon attributed to the weight of the foamed parison hardly occurs.

The polypropylene-based resin used as the polyolefin-based resin is desired to have a melt flow rate of 1 to 20 g/10 min and a melt tension of 1.5 cN or more. On the other hand, the polyethylene-based resin used as the polyolefin-based resin is desired to have a density of 0.93 to 0.97 g/cm$^3$, a melt flow rate of 0.1 to 20 g/10 min and a melt tension of 1.0 cN or more.

The above-mentioned "melt flow rate" refers to a melt mass flow rate as measured according to JIS K7210(1999), Test Method A under the conditions of a temperature of 230° C. and a load of 2.16 kg when the polyolefin resin is a polypropylene-based resin, and a temperature of 190° C. and a load of 2.16 kg when the polyolefin resin is a polyethylene-based resin.

It is preferred that the foamable resin melt used for forming the above-described foamed parison is incorporated with a cell controlling agent such as talc. The cell controlling agent is generally used in the form of a master batch containing a base resin, composed mainly of the thermoplastic resin, and the cell controlling agent. The cell controlling agent is generally used in an amount of 0.05 to 10 parts by weight based on 100 parts by weight of the thermoplastic resin.

If necessary, in addition to the cell controlling agent, various additives such as a flame retardant, a fluidity improver, a weatherability agent, a colorant, a thermal stabilizer, a filler, an antistatic agent and an electrical conductivity imparting agent may be incorporated as appropriate.

In the method of the present invention, a multilayer parison in which a non-foam resin layer is laminated on the foamed parison composed of the above-described resin may be used. The non-foam resin layer may be provided on any desired side of the foamed parison (foam layer). It is also possible to laminate the non-foam resin layer on both sides of the foamed parison in a sandwich state. Such a multilayer foamed parison is preferably formed by coextrusion from a die.

As the resin constituting the non-foam resin layer, one which is similar to that used in the above-described foamed layer may be used. If necessary, an additive such as a flame retardant, a fluidity improver, a UV absorbing agent, an electrical conductivity imparting agent, a colorant, a thermal stabilizer, an antioxidant and an inorganic filler may be incorporated into the resin that constitutes the non-foam resin layer as appropriate.

In the method of the present invention, as the physical blowing agent used for the formation of the foamable resin melt, there may be mentioned, for example, an organic physical blowing agent such as aliphatic hydrocarbons, e.g. propane, n-butane, isobutane, n-pentane, isopentane, n-hexane, isohexane and cyclohexane, chlorinated hydrocarbons, e.g. methyl chloride and ethyl chloride, fluorinated hydrocarbons, e.g. 1,1,1,2-tetrafluoroethane and 1,1-difluoroethane, and alcohols having a boiling point not higher than the extrusion temperature; or an inorganic physical blowing agent such as carbon dioxide and nitrogen. These physical blowing agents may be used in the form of a mixture or in conjunction with a decomposition type blowing agent such as sodium hydrogen carbonate and azodicarbonamide.

Among the above-described physical blowing agents, it is preferable to use an inorganic physical blowing agent such as carbon dioxide and nitrogen for reasons that the molding cycle time may be shortened and the obtained hollow foamed molded article has an improved dimensional stability. In particular, whilst the inorganic physical blowing agent tends to form larger corrugations as compared with an aliphatic hydrocarbon or a fluorinated hydrocarbon because of its low solubility in a thermoplastic resin and of its high foaming speed, the method of the present invention can eliminate corrugation even when an inorganic physical blowing agent is used and, further, even when the using amount of the blowing agent is increased so as to obtain a molded article having a low apparent density.

The using amount of the above-described blowing agent may be determined as appropriate with consideration of the desired apparent density (expansion ratio). In general, the physical blowing agent is used in an amount of 0.01 to 1.2 mol per 1 kg of the base resin such as the thermoplastic resin.

The foamed blow-molded article obtained by the method of the present invention preferably has an apparent density of 0.1 to 0.25 g/cm$^3$, more preferably 0.12 to 0.22 g/cm$^3$, still more preferably 0.15 to 0.2 g/cm$^3$. Even when production of a foamed blow-molded article having such a low apparent density that might lead to formation of corrugation is intended, the method of the present invention enables to obtain the molded article in a stable manner.

As used herein, the "apparent density" of a foamed blow-molded article is as determined by the following method. The foamed blow-molded article is measured for its weight (g). Then the molded article is immersed in water to measure the volume ($cm^3$) thereof. The measured weight is divided by the weight to calculate the apparent density of the foamed body. The obtained value represents the apparent density of the foamed blow-molded article.

The foamed blow-molded article preferably has an average thickness of 1 to 4 mm, more preferably 1.5 to 3.5 mm, still more preferably 1.6 to 3.0 mm. In case where the clearance of the annular die is narrowed to make the thickness of the molded article thinner, the foaming speed tends to increase and the corrugation tends to occur more easily as compared with the conventional case, because the pressure difference at the time of foaming increases. Even in such a case, the method of the present invention can eliminate corrugation and can produce foam blow-molded articles having such an average thickness range in a stable manner.

The average thickness in the present invention is measured as follows. Measurement is carried out on vertical cross-sections of a foamed blow-molded article at five positions including a position near the midpoint in the longitudinal direction thereof, positions near both longitudinal ends thereof and positions near the centers between the midpoint and the both ends. Each of the cross-sections is measured for the thickness in the thickness direction at six locations which are equally spaced from each other in the perimeter direction thereof. Thus, thickness values at 30 locations are obtained. The average thickness is the arithmetic mean of the twenty eight (28) measured thickness values excluding the maximum and minimum values.

The foamed blow-molded article preferably has a closed cell content of 60% or more, more preferably 80% or more, particularly preferably 90% or more from the standpoint of its heat insulating property and mechanical property. The closed cell content of the foamed blow-molded article may be measured according to Procedure C of ASTM D-2856-70 using Air Comparison Pycnometer Type-930 manufactured by Toshiba Beckman Inc.

In the method of the present invention, the apparent density of the foamed blow-molded article is controlled to the above-described range by using a method in which the kind of the thermoplastic resin, the kind and using amount of the physical blowing agent, the discharge rate and the resin temperature at the time the foamable molten resin melt is extruded through a die, etc. are controlled. More concretely, when the foamable resin melt is composed of a polyolefin-based resin, it is preferred that the polyolefin resin used has a melt tension (MT) in the above-described range. When the amount of the blowing agent is increased, the apparent density of the obtained foamed blow-molded article is low. However, when the blowing agent is used in an excess amount, the closed cell content is apt to be lowered. Therefore, the amount of the blowing agent is determined with a consideration of a balance between the apparent density and the closed cell content.

As a method for adjusting the average thickness of the foamed blow-molded article, there may be mentioned, for example, a method in which an injection pressure of a gas into the foamed parison at the time of the blow molding is controlled within the above-described range, a method in which a gap (clearance) in the annular die lip is controlled and a method in which a widening ratio of the parison is controlled. The gap (clearance) is controlled within the range of about 0.1 to 10 mm.

EXAMPLES

The method for producing a foamed blow-molded article according to the present invention will be described in more detail below by way of specific examples. The present invention is, however, not limited to the examples.

The thermoplastic resins used for forming foamed parison are shown in Table 1.

TABLE 1

| Resin | Kind | Maker | Grade | MT (230° C.) CN | MFR (230° C., 2.16 kg) g/10 min |
|---|---|---|---|---|---|
| A1 | Polypropylene | Borealis | WB140 | 39 | 1.7 |
| A2 | Polypropylene | — | — | 9 | 5.9 |
| B1 | Olefin elastomer | Sunallomer | Q100F | 4 | 0.6 |
| C1 | — | — | — | 2 | 19 |

The resin A2 shown in Table 1 was prepared as follows. Polypropylene A1 was extruded at 230° C. using a twin screw extruder having an inside diameter of 47 mm, and then repelletized. The repelletized resin was again extruded under the same conditions and then repelletized to obtain the recycled resin A2. The resin C1 shown in Table 1 was prepared as follows. Polypropylene A1 and olefin-based elastomer B1 were mixed (A1/B1=85/15 (weight ratio)) and the mixture was extruded at 230° C. using a twin screw extruder having an inside diameter of 47 mm, and then repelletized. The repelletized product was subjected five times to repeated procedures of extrusion and repelletization under the same conditions to obtain the recycled resin C1.

Example 1

As shown in Table 2, resin A1 (polypropylene WB140 manufactured by Borealis Inc.) and resin A2 are dry-blended in a weight ratio of 20:80. A raw material feed obtained by adding to 0.9 part by weight of talc as a cell controlling agent to 100 parts by weight of these resins was fed to an extruder having a diameter of 65 mm and melted and kneaded in the extruder. Carbon dioxide ($CO_2$) was then supplied to an intermediate portion of the extruder under pressure in an amount of 0.27 mol/kg per 1 kg of the base resin and kneaded to form a foamable resin melt. The foamable resin melt was charged in an accumulator connected to the extruder. The foamable resin melt was then extruded, through an annular lip which had a diameter of 75 mm and which was provided at a tip of the accumulator, into a tubular shape at a clearance (mm) and a discharge rate (kg/hr) shown in Table 2 to the atmosphere and allowed to foam thereby forming a foamed parison. After a bottom portion of the foamed parison had been pinched, air at a pressure shown in Table 2 was ejected horizontally in all directions from an annular slit, which served as a gas ejection outlet and which was provided within the foamed parison at a position 2 cm just below the annular die, and blown on an inner peripheral portion of the foamed parison to expand the foamed parison. The foamed parison was then clamped by two-split molds disposed immediately below the die. The blowing of the air was carried out until the clamping was completed.

Next, blow air at a pressure of 0.1 MPa(G) was blown into the foamed parison through a nozzle that was penetrated into a lower part of the foamed parison, while air was evacuated through holes provided in the molds, to shape the foamed parison into the mold shape. After cooling, the molds were opened and the blow-molded product was taken out of the molds. Mold flash was removed from the molded product to give a foamed blow-molded article having a maximum perimeter length of 370 mm, a maximum width of 170 mm and a vertical length of 740 mm.

Examples 2 to 4

Foamed blow-molded articles were obtained in the same manner as that in Example 1 except that the ejection pressure from the gas ejection outlet was changed as shown in Table 2.

Examples 5 to 8

Foamed blow-molded articles were obtained in the same manner as that in Example 1 except that the ejection of air from the annular slit was started 0.3 second after the foamable resin melt was extruded (before the bottom portion of the foamed parison was pinched) and that the ejection pressure was as shown in Table 2. Namely, blowing of air from the annular slit was started immediately after the foamable resin melt was extruded through the annular die. The foamed parison was pinched and allowed to expand. The blowing of air from the gas ejection outlet was continued until the clamping of the parison between the molds was completed.

Comparative Example 1

A foamed blow-molded articles was tried to be obtained in the same manner as that in Example 1 except that air was blown from a gas ejection outlet, provided in the center of the annular die as shown in FIG. 7, toward the lowermost portion of the foamed parison (directly downward) to expand the foamed parison. However, because corrugation in an upper portion of the foamed parison was not able to be eliminated, ridges were formed in the molded article. It was difficult to obtain a good foamed blow-molded article.

Comparative Example 2

A foamed blow-molded articles was tried to be obtained in the same manner as that in Comparative Example 1 except that the ejection pressure was changed as shown in Table 2. The widening ratio in an upper portion of the parison was adjusted to 3 or more by increasing the air ejection pressure. However, since the air ejection direction was downward, the foamed parison was not evenly widened in an upper portion thereof. Therefore, part of the region (trough) between adjacent crests of a corrugation was fusion bonded so that corrugation in an upper region of the foamed parison was not able to be eliminated. As a result, ridges were formed in the molded article. It was difficult to obtain a good foamed blow-molded article.

Comparative Examples 3 and 4

When the air ejection was further strengthened, a lower portion of the foamed parison was excessively widened. Thus, an upper portion of the foamed parison tended to be insufficiently widened. As a result, ridges were formed in the molded article. It was difficult to obtain a good foamed blow-molded article.

Example 9

A foamed blow-molded article was obtained in the same manner as that in Example 1 except that the raw material resins were changed to (resin A1): (resin B1, olefin elastomer Adflex Q100F manufactured by Sunallomer Inc.): (resin C1)=17:3:80, as shown in Table 3, and that the amount of the blowing agent and air ejection pressure were changed as shown in Table 3. The increase of the amount of the blowing agent enabled to obtain a foamed blow-molded article which had a low apparent density.

Example 10

A foamed blow-molded article was obtained in the same manner as that in Example 1 except that the raw material resins were changed as shown in Table 3 and that the amount of the blowing agent, discharge rate, die clearance and air ejection pressure were changed as shown in Table 3. The reduction of the clearance of the annular die and decrease of the discharge rate enabled to obtain the foamed blow-molded article which had a thin average thickness.

Example 11

A foamed blow-molded article was obtained in the same manner as that in Example 1 except that the raw material resins were changed as shown in Table 3 and that the die clearance was changed to the condition shown in Table 3. The change of the raw material resins and increase of the clearance of the annular die resulted in a reduction of the rate of occurrence of corrugation and a reduction of the rate of occurrence of ridges because the apparent density of the foamed parison was greater than that in Example 1.

Comparative Example 5

A foamed blow-molded articles was tried to be obtained in the same manner as that in Example 11 except that air was blown from a gas ejection outlet, provided in the center of the annular die, toward the lowermost portion of the parison as shown in FIG. 7. However, because corrugation was not able to be eliminated, ridges were formed in the molded article. It was difficult to obtain a good foamed blow-molded article.

The foam blow molding conditions in Examples and Comparative Examples are shown in Tables 2 and 3, and the physical properties of the obtained foamed blow-molded articles are shown in Table 4. The perimeter lengths of the obtained foamed parisons are shown in Table 5. In Tables 2 and 3, 1* indicates that the gas ejection from the annular slit was carried out after the parison had been pinched, while 2* indicates that the gas ejection was started before pinching the parison (immediately after the parison had been extruded).

TABLE 2

| | Raw material resins mixing ratio | Blowing agent Kind | Amount [mol/kg] | Discharge rate [kg/hr] | Clearance [mm] | Gas ejection condition | | | Maximum widening ratio |
|---|---|---|---|---|---|---|---|---|---|
| | | | | | | Ejection direction | Ejection pressure [MPa] | Ejection starting time | |
| Example 1 | A1/A2 = 20/80 | $CO_2$ | 0.27 | 900 | 0.2 | horizontal | 0.1 | 1* | 3.5 |
| Example 2 | A1/A2 = 20/80 | $CO_2$ | 0.27 | 900 | 0.2 | horizontal | 0.2 | 1* | 3.5 |
| Example 3 | A1/A2 = 20/80 | $CO_2$ | 0.27 | 900 | 0.2 | horizontal | 0.4 | 1* | 3.7 |
| Example 4 | A1/A2 = 20/80 | $CO_2$ | 0.27 | 900 | 0.2 | horizontal | 0.6 | 1* | 3.7 |
| Example 5 | A1/A2 = 20/80 | $CO_2$ | 0.27 | 900 | 0.2 | horizontal | 0.1 | 2* | 3.8 |
| Example 6 | A1/A2 = 20/80 | $CO_2$ | 0.27 | 900 | 0.2 | horizontal | 0.2 | 2* | 3.5 |
| Example 7 | A1/A2 = 20/80 | $CO_2$ | 0.27 | 900 | 0.2 | horizontal | 0.4 | 2* | 3.5 |
| Example 8 | A1/A2 = 20/80 | $CO_2$ | 0.27 | 900 | 0.2 | horizontal | 0.6 | 2* | 3.5 |
| Comparative Example 1 | A1/A2 = 20/80 | $CO_2$ | 0.27 | 900 | 0.2 | vertical | 0.1 | 1* | 3.7 |
| Comparative Example 2 | A1/A2 = 20/80 | $CO_2$ | 0.27 | 900 | 0.2 | vertical | 0.2 | 1* | 3.5 |
| Comparative Example 3 | A1/A2 = 20/80 | $CO_2$ | 0.27 | 900 | 0.2 | vertical | 0.4 | 1* | 7.2 |
| Comparative Example 4 | A1/A2 = 20/80 | $CO_2$ | 0.27 | 900 | 0.2 | vertical | 0.6 | 1* | 6.6 |

TABLE 3

| | Raw material resins mixing ratio | Blowing agent Kind | Amount [mol/kg] | Discharge rate [kg/hr] | Clearance [mm] | Gas ejection condition | | |
|---|---|---|---|---|---|---|---|---|
| | | | | | | Ejection direction | Ejection pressure [MPa] | Ejection starting time |
| Example 9 | A1/B1/C1 = 17/3/80 | $CO_2$ | 0.36 | 900 | 0.2 | horizontal | 0.6 | 1* |
| Example 10 | A1/B1/C1 = 17/3/80 | $CO_2$ | 0.36 | 480 | 0.1 | horizontal | 0.6 | 1* |
| Example 11 | A1/B1/C1 = 17/3/80 | $CO_2$ | 0.27 | 900 | 0.4 | horizontal | 0.1 | 1* |
| Comparative Example 6 | A1/B1/C1 = 17/3/80 | $CO_2$ | 0.27 | 900 | 0.4 | vertical | 0.1 | 1* |

TABLE 4

Physical properties of foamed molded articles

| | Apparent density [g/cm³] | Average thickness [mm] | Closed cell content [%] | Rate of occurrence of ridges |
|---|---|---|---|---|
| Example 1 | 0.14 | 3.7 | 94 | A |
| Example 2 | 0.14 | 3.5 | 93 | A |
| Example 3 | 0.15 | 3.3 | 95 | A |
| Example 4 | 0.14 | 3.7 | 92 | A |
| Example 5 | 0.14 | 3.7 | 90 | A |
| Example 6 | 0.14 | 3.7 | 93 | A |
| Example 7 | 0.14 | 3.6 | 90 | A |
| Example 8 | 0.14 | 3.6 | 93 | A |
| Example 9 | 0.11 | 3.7 | 87 | B |
| Example 10 | 0.14 | 2.3 | 89 | B |
| Example 11 | 0.18 | 3.5 | 93 | A |
| Comparative Example 1 | 0.14 | 3.3 | 91 | D |
| Comparative Example 2 | 0.14 | 3.4 | 91 | D |
| Comparative Example 3 | 0.14 | 3.4 | 91 | D |
| Comparative Example 4 | 0.14 | 3.3 | 91 | D |
| Comparative Example 5 | 0.20 | 3.3 | 93 | D |

TABLE 5

Perimeter length D2 [mm] and Widening ratio of Foamed Parison

| | Measuring point (distance from starting point) [mm] | | | | | | | | |
|---|---|---|---|---|---|---|---|---|---|
| | 0 | 100 | 200 | 300 | 400 | 500 | 600 | 700 | Average |
| Example 1 | 820 | 710 | 710 | 710 | 730 | 756 | 790 | 824 | 756 |
| | 3.5 | 3.0 | 3.0 | 3.0 | 3.1 | 3.2 | 3.4 | 3.5 | 3.2 |
| Example 2 | 830 | 740 | 720 | 720 | 710 | 730 | 760 | 790 | 750 |
| | 3.5 | 3.1 | 3.1 | 3.1 | 3.0 | 3.1 | 3.2 | 3.4 | 3.2 |
| Example 3 | 860 | 750 | 730 | 734 | 736 | 740 | 760 | 796 | 763 |
| | 3.6 | 3.2 | 3.1 | 3.1 | 3.1 | 3.1 | 3.2 | 3.4 | 3.2 |
| Example 4 | 870 | 746 | 746 | 744 | 750 | 760 | 786 | 820 | 778 |
| | 3.7 | 3.2 | 3.2 | 3.2 | 3.2 | 3.2 | 3.3 | 3.5 | 3.3 |
| Example 5 | 900 | 740 | 740 | 740 | 740 | 754 | 770 | 800 | 773 |
| | 3.8 | 3.1 | 3.1 | 3.1 | 3.1 | 3.2 | 3.3 | 3.4 | 3.3 |
| Example 6 | 844 | 746 | 750 | 740 | 730 | 734 | 754 | 792 | 761 |
| | 3.6 | 3.2 | 3.2 | 3.1 | 3.1 | 3.1 | 3.2 | 3.4 | 3.2 |
| Example 7 | 820 | 760 | 740 | 740 | 734 | 740 | 756 | 800 | 761 |
| | 3.5 | 3.2 | 3.1 | 3.1 | 3.1 | 3.1 | 3.2 | 3.4 | 3.2 |
| Example 8 | 830 | 766 | 760 | 750 | 760 | 760 | 770 | 820 | 777 |
| | 3.5 | 3.3 | 3.2 | 3.2 | 3.2 | 3.2 | 3.3 | 3.5 | 3.3 |
| Comparative Example 1 | 790 | 690 | 712 | 734 | 780 | 852 | 866 | 860 | 786 |
| | 3.4 | 2.9 | 3.0 | 3.1 | 3.3 | 3.6 | 3.7 | 3.6 | 3.3 |
| Comparative Example 2 | 800 | 734 | 746 | 750 | 748 | 762 | 810 | 828 | 772 |
| | 3.4 | 3.1 | 3.2 | 3.2 | 3.2 | 3.2 | 3.4 | 3.5 | 3.3 |
| Comparative Example 3 | 450 | 658 | 734 | 840 | 1454 | 1600 | 1700 | 1520 | 1120 |
| | 1.9 | 2.8 | 3.1 | 3.6 | 6.2 | 6.8 | 7.2 | 6.5 | 4.8 |
| Comparative Example 4 | 338 | 580 | 692 | 808 | 1490 | 1550 | 1540 | 1410 | 1051 |
| | 1.4 | 2.5 | 2.9 | 3.4 | 6.3 | 6.6 | 6.5 | 6.0 | 4.5 |

In Table 4, the apparent density, average thickness and closed cell content were measured by the following methods.

Apparent density of foamed blow-molded article:

The apparent density of a foamed blow-molded article was determined by dividing the weight (g) of the foamed blow-molded article by the volume (cm³) of the foamed blow-molded article (n=5; arithmetic mean of apparent densities of five molded articles that were selected at random from 50 (fifty) molded articles).

Average thickness of foamed blow-molded article:

The average thickness of a foamed blow-molded article was measured as follows. The foamed blow-molded article was measured for its thickness at 5 positions including a position near the midpoint in the longitudinal direction thereof (generally in the extrusion direction of the foamed parison), positions near both ends thereof and positions near the centers between the midpoint and the both ends (a position where the foamed blow-molded article has a special shape, such as a location for fitting engagement, should be avoided). In each of these positions, thickness measurement was done at 6 locations which were equally spaced from each other along the perimeter thereof. Among the measure thicknesses at 30 locations, the maximum and minimum values were excluded. The average thickness is the arithmetic mean of the 28 measured thickness values (n=5). Incidentally, when the locations to be measured included, for example, a location of a duct provided with a discharge aperture at which thickness measurement was not able to be made, other perimeter than the discharge aperture or the like was divided into six equal length sections and thickness measurement was done at a center portion of each of the six sections.

Closed cell content:

The closed cell content of a foamed blow-molded article was calculated by the formula (1) below upon determining Vx according to Procedure C of ASTM D-2856-70 (reapproved 1976) using a specimen that was cut out from the foamed blow-molded article:

$$\text{Closed cell content}(\%) = (Vx - W/\text{ps}) \times 100 / (Va - W/\text{ps}) \qquad (1)$$

Vx: the true volume (cm³) of the specimen (a sum of a volume of the closed cells and a volume of the resin thereof, Va: an apparent volume (cm³) of the specimen, which is determined from the outer dimensions thereof, W: a weight (g) of the specimen, ps: a density (g/cm³) of the base resin of the specimen.

Closed cell contents were measured at positions near the 5 positions at which the thicknesses of the foamed blow-molded article were measured. An arithmetic mean of the measured values is the closed cell content of the foamed blow-molded article (n=5). As a measuring device, Air Comparison Pycnometer (Model-930) manufactured by Toshiba Beckman Inc. was used.

Rate of occurrence of ridges:

In Table 4, the rate of occurrence of ridges per 50 molded articles was evaluated based on the following criteria:
A: less than 10%
B: 10% or more and less than 20%
C: 20% or more and less than 70%
D: 70% or more Perimeter Length D2 of the Foamed Parison In Table 5, the perimeter length (D2) of the foamed parison was measured as follows. Foam blow molding was first carried out as described in Examples. After the molding in the molds, a foamed blow-molded body (a) that had solidified molding flash was obtained. The flash-bearing molded body (a) was measured for its width at 7 positions (in total) spaced at an interval of 100 mm from a starting point (0 mm) that was spaced a distance of 300 mm below the die. The perimeter length (D2) of the foamed parison is a double of the measured value (n=5) and shown in Table 5. Because the flash-bearing molded body (a) is obtained by solidifying the foamed parison, the value obtained by doubling the width of the molded body (a) including the flash nearly corresponds to the perimeter length (D2) of the foamed parison. The widening ratio in Table 5 was calculated by dividing the perimeter length (D2) by the perimeter length of the annular die.

As will be understood from Table 5, the foamed parison obtained by the method of the present invention excels in uniformity of the perimeter length of the foamed parison and in blow molding efficiency. When, however, the gas ejection direction was directly downward from the annular die as shown in Comparative Example 2, it was difficult to eliminate corrugation of the foamed parison although the perimeter length of the parison was uniform. As shown in Comparative Examples 3 and 4, when the gas ejection direction was directly downward from the annular die and when the gas ejection pressure was increased, a lower portion of the parison was excessively widened due to an increase of the flow rate of the air flow so that corrugation was not able to be eliminated.

The invention claimed is:

1. A method for producing a foamed blow-molded article, comprising the steps of:
  (a) extruding a physical blowing agent-containing foamable molten resin vertically downwardly through an annular die to form a tubular foamed parison,
  (b) closing a bottom portion of the foamed parison,
  (c) blowing a gas toward a whole inner peripheral surface of an upper portion of the foamed parison, the bottom portion of which has been closed, from a gas ejection outlet located within the foamed parison at a position below the annular die to form a gas stream that directly impinges upon the whole inner peripheral surface and to widen the foamed parison,
  (d) closing split molds to clamp the foamed parison therebetween, and
  (e) blow molding the foamed parison within the split molds,
  wherein step (c) is carried out at the latest before completion of step (d),
  wherein the gas ejection outlet is positioned only between just below a resin discharge outlet of the annular die and above the split molds, and
  wherein the upper portion of the foamed parison is a portion of the foamed parison from the resin discharge outlet of the annular die to ⅓ the length of the foamed parison, said length being a vertical length between the resin discharge outlet of the annular die and the closed bottom portion of the foamed parison,
  wherein a ratio (D2/D1) of a perimeter length (D2) of the foamed parison that has been widened in step (c) to a perimeter length (D1) of the resin discharge outlet of the annular die is 3.0 to 5, and
  wherein the foamed blow-molded article obtained in step (e) has an apparent density of 0.1 to 0.25 g/cm$^3$ and an average wall thickness of 1 to 4 mm.

2. The method as recited in claim 1, wherein the physical blowing agent is an inorganic physical blowing agent.

3. The method as recited in claim 1, wherein the gas ejection outlet is an annular slit and the gas is ejected from the gas ejection slit in all 360 degrees directions around a centerline of the annular die.

4. The method as recited in claim 1, wherein the gas ejection outlet is provided at a position between 0.5 and 15 cm below the discharge outlet of the annular die.

5. The method as recited in claim 1, wherein the blow molding occurs through the bottom portion of the foamed parison.

6. The method as recited in claim 1, wherein in step (c) the gas is blown in a nearly horizontal direction.

7. The method as recited in claim 1, wherein in step (c) the pressure of the gas supplied to the ejection outlet is about 0.05 to 1 MPa(G).

8. The method as recited in claim 7, wherein in step (c) the pressure of the gas supplied to the ejection outlet is about 0.1 to 0.6 MPa(G).

9. A method for producing a foamed blow-molded article, comprising the steps of:
  (a) extruding a physical blowing agent-containing foamable molten resin vertically downwardly through an annular die to form a tubular foamed parison,
  (b) closing a bottom portion of the foamed parison,
  (c) blowing a gas toward a whole inner peripheral surface of an upper portion of the foamed parison, the bottom portion of which has been closed, from a gas ejection outlet located within the foamed parison at a position below the annular die to form a gas stream that directly impinges upon the whole inner peripheral surface and to widen the foamed parison,
  (d) closing split molds to clamp the foamed parison therebetween, and
  (e) blow molding the foamed parison within the split molds,
  wherein step (c) is carried out at the latest before completion of step (d),
  wherein the gas ejection outlet is positioned only between just below a resin discharge outlet of the annular die and above the split molds,
  wherein, in step (c), the gas is ejected from the gas ejection outlet at an angle of 70-110 degrees relative to the vertical direction, and
  wherein the gas ejection outlet is an annular slit and the gas is ejected from the gas ejection slit in all 360 degrees directions around a centerline of the annular die only towards the upper portion of the foamed parison,
  wherein a ratio (D2/D1) of a perimeter length (D2) of the foamed parison that has been widened in step (c) to a perimeter length (D1) of the resin discharge outlet of the annular die is 3.0 to 5, and wherein the foamed blow-molded article obtained in step (e) has an apparent density of 0.1 to 0.25 g/cm³ and an average wall thickness of 1 to 4 mm.

10. A method for producing a foamed blow-molded article, comprising the steps of:
   (a) extruding a physical blowing agent-containing foamable molten resin vertically downwardly through an annular die to form a tubular foamed parison,
   (b) closing a bottom portion of the foamed parison,
   (c) blowing a gas in a nearly horizontal direction toward a whole inner peripheral surface of an upper portion of the foamed parison, the bottom portion of which has been closed, from a gas ejection outlet located within the foamed parison at a position below the annular die to form a gas stream that directly impinges upon the whole inner peripheral surface and to widen the foamed parison,
   (d) closing split molds to clamp the foamed parison therebetween, and
   (e) blow molding the foamed parison within the split molds,
   wherein step (c) is carried out at the latest before completion of step (d), and
   wherein the gas ejection outlet is positioned only between just below a resin discharge outlet of the annular die and above the split molds and only ejects the gas toward the upper portion of the foamed parison,
   wherein a ratio (D2/D1) of a perimeter length (D2) of the foamed parison that has been widened in step (c) to a perimeter length (D1) of the resin discharge outlet of the annular die is 3.0 to 5, and
   wherein the foamed blow-molded article obtained in step (e) has an apparent density of 0.1 to 0.25 g/cm³ and an average wall thickness of 1 to 4 mm.

11. The method as recited in claim 10, wherein the physical blowing agent is an inorganic physical blowing agent.

12. The method as recited in claim 10, wherein, in step (c), the gas is ejected from the gas ejection outlet at an angle of 70-110 degrees relative to the vertical direction.

13. The method as recited in claim 10, wherein the gas ejection outlet is an annular slit and the gas is ejected from the gas ejection slit in all 360 degrees directions around a centerline of the annular die.

14. The method as recited in claim 10, wherein the gas ejection outlet is provided at a position between 0.5 and 15 cm below the discharge outlet of the annular die.

15. The method as recited in claim 10, wherein the upper portion of the foamed parison is a portion of the foamed parison from a parison discharge outlet of the annular die to ⅓ the length of the foamed parison.

* * * * *